March 2, 1971  D. E. PETERSON  3,567,268
FLEXIBLE CONDUIT PULLING MEANS
Filed Dec. 18, 1968
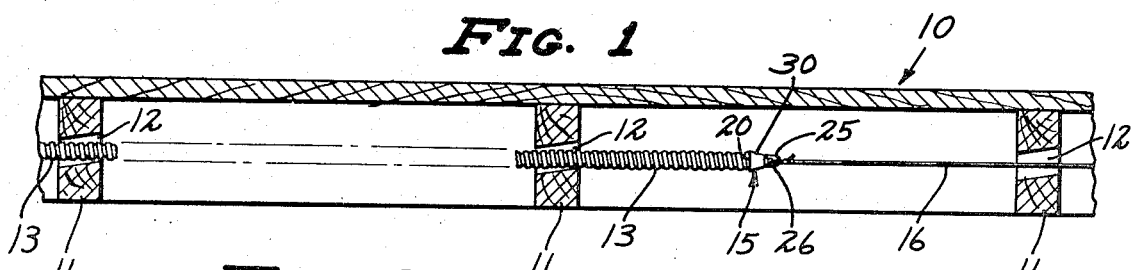
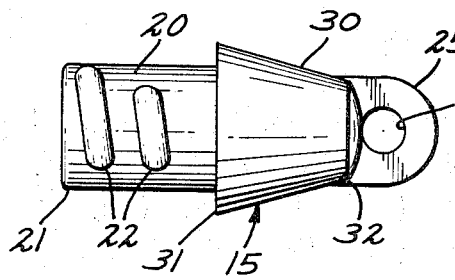
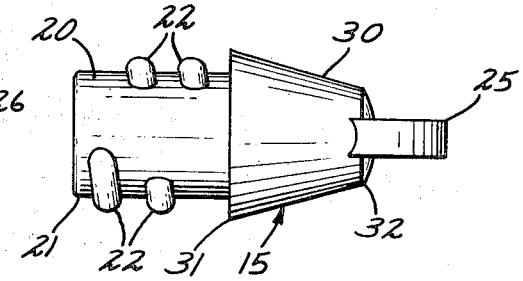
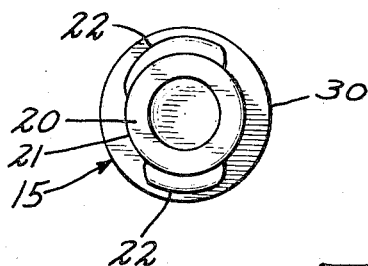
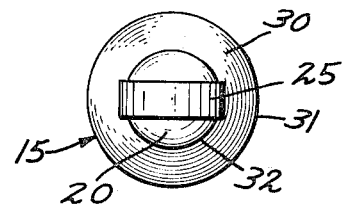
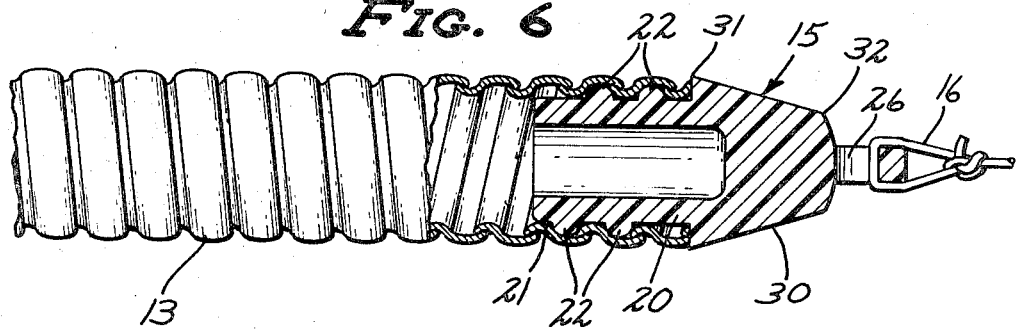
INVENTOR.
DONALD E. PETERSON
BY
Merchant & Gould
ATTORNEYS

United States Patent Office 3,567,268
Patented Mar. 2, 1971

3,567,268
FLEXIBLE CONDUIT PULLING MEANS
Donald E. Peterson, Box 218, Medford, Minn. 55049
Filed Dec. 18, 1968, Ser. No. 784,821
Int. Cl. B25b
U.S. Cl. 294—86                                    2 Claims

ABSTRACT OF THE DISCLOSURE

A body having a cylindrical portion with outside threads thereon adapted to threadedly engage a flexible conduit, a shroud or conical portion for protecting the end of the conduit from catching and for directing the end of the conduit into and through the various openings, and an eye at one end adapted to receive ae flexible cord therethrough for pulling the conduit.

BACKGROUND OF THE INVENTION

Field of the invention

At the present time flexible conduit is used in many instances for electrical wiring in houses and other types of structures. It is generally the custom to form a path through the structure, by drilling holes and the like through beams, etc., and then drawing the flexible conduit along the path until it is correctly positioned. Once the conduit is positioned two or more electrical wires are drawn through the conduit so as to extend outwardly from either end thereof. The wires can then be connected into the desired electrical circuit and the flexible conduit serves as armour to protect the wires and aid in protecting the structure from the wires in the event of short circuits and the like.

Description of the prior art

In the prior art it is common to pass a cord along the path formed for the conduit and then attach one end of the cord to one end of the conduit and pull the cord with the conduit along the path. This is extremely difficult and undesirable because the forward end of the conduit has a tendency to catch at the various openings so that it is necessary to guide the conduit through each opening. In many instances the openings are not readily accessible and guiding the end of the conduit is extremely difficult. For the same reason simply threading the conduit from opening to opening through the structure in the desired path is also extremely unsatisfactory and time consuming.

SUMMARY OF THE INVENTION

The present invention pertains to flexible conduit pulling means including an elongated body having a threaded portion adjacent one end thereof and means adjacent the other end for connecting an elongated flexible cord thereto with shroud means affixed to said body therebetween to protect the end of the cable and guide said cable into and through openings in a structure.

It is an object of the present invention to provide new and improved flexible conduit pulling means.

It is a further object of the present invention to provide flexible conduit pulling means which are inexpensive and simple to manufacture and which are simple and efficient to operate.

These and other objects of this invention will become apparent to those skilled in the art upon consideration of the accompanying specification, claims, and drawings.

BRIEF DESCRIPTION OF THE DRAWINGS

Referring to the drawings, wherein like characters indicate like parts throughout the figures:

FIG. 1 is a sectional view of a portion of a structure, such as a floor, illustrating the use of the present device for pulling a flexible conduit;

FIG. 2 is a view in side elevation of the present device;

FIG. 3 is a view in side elevation of the device illustrated in FIG. 2, rotated 90° about its longitudinal axis;

FIG. 4 is a view in end elevation as seen from the left end of FIG. 2;

FIG. 5 is a view in end elevation as seen from the right end of FIG. 2; and

FIG. 6 is a view of the present pulling means engaged with the end of a flexible conduit, portions thereof broken away and shown in section.

DESCRIPTION OF THE PREFERRED EMBODIMENT

Referring to FIG. 1 the numeral 10 generally designates a floor or other similar structure having a plurality of beams 11 connected thereunder in the usual manner. Each of the beams 11 has a hole 12 therethrough formed for the passage of a flexible conduit 13. A pulling means 15 formed in accordance with the present invention is attached to the forward end of the flexible conduit 13 and has a cord 16 attached thereto. The cord 16 is threaded through the holes 12 and attached to the pulling means 15, which is in turn attached to the flexible conduit 13, and pulling the cord 16 draws the pulling means 15 and the flexible conduit 13 through the holes 12 and into the desired position.

The pulling means 15 has an elongated body 20 with a generally cylindrical portion 21 adjacent the rear end, or left side in FIGS. 2 and 3. The cylindrical portion 21 has radially outwardly extending thread portions 22 formed integral with the outer periphery thereof. As can be seen in FIGS. 2 and 3 the thread portions 22 do not extend completely around the cylindrical portion 21 but rather are formed in several separate portions. Forming the thread portions 22 in this fashion makes the pulling means 15 easier to connect to various flexible conduits 13, even if the conduits 13 are slightly misformed.

The end of the body 20 opposite the cylindrical portion 21 has a flattened portion 25 extending axially outwardly therefrom with a generally semicircular leading edge and a hole 26 through approximately the center thereof perpendicular to the axis of the body 20. The hole 26 is adapted to receive the cord 16 therethrough and the leading edge of the flattened portion 25 is formed in a generally semicircular pattern so as to slip easily through holes 12 in the beams 11 without catching or causing other undue resistance. The flattened portion 25 and the hole 26 form means for connecting a flexible pulling member, or cord 16, to the body 20 but it should be understood that many other types of connecting means might be designed which would also operate to perform the functions of the present device.

Affixed to the body 20 between the cylindrical portion 21 and the flattened portion 25 is a shroud 30. In this embodiment the shroud 30 is a generally conical portion with a large end 31 adjacent the cylindrical portion 21 and a smaller end 32 adjacent the flattened portion 25. In this embodiment the smaller end 32 does not extend to a point but is somewhat rounded to aid in guiding the pulling means 15 through holes 12. The large end 31 has an outside diameter somewhat larger than the outside diameter of the flexible conduit 13 and serves to protect the leading end of the flexible conduit 13 to prevent snagging and the like in holes 12 or on other pieces of the structure along the path. While the shroud 30 is shown as a portion of a cone in the present embodiment it should be understood that it might be formed as a portion of a sphere or in many other embodiments and it would still perform the functions of the present invention.

In the present embodiment the cylindrical portion 21, the shroud 30 and the flattened portion 25 are all formed in one integral unit to make up the body 20. It should be understood, however, that the various portions could be made separately and joined together by some means such as welding, gluing, threadedly engaging, etc. Also, in the present embodiment the pulling means 15 is molded from a suitable material such as relatively hard plastic but it might also be formed from metals or the like and it can be formed by molding, machining, etc.

Referring to FIG. 6 the body 20 is threadedly engaged to the conduit 13 with the cylindrical portion 21 threadedly engaged therein. It should be noted that the cord 16 is affixed through the hole 26 in the flattened portion 25 and pulling on the cord 16 provides a straight axial pull on the pulling means 15 and the flexible conduit 13. Because of this straight axial pull the cord 16 directs the flattened portion 25 and the shroud 30 into each of the holes 12 rather than causing them to cant off to the side, as is the case when a cord is attached directly to the flexible conduit 13. Also, the shroud 30 directs the end of the flexible conduit 13 and protects it from snags and undue resistance.

Thus, a pulling means 15 is disclosed which is simple and inexpensive to construct and which greatly enhances the pulling of flexible conduits for electrical wiring. The pulling means 15 is simple to attach and detach and it serves to aid in guiding the end of the flexible conduit as well as protecting the end of the flexible conduit and surrounding materials from damage.

What is claimed is:
1. Pulling means for installing flexible conduit of the type formed of overlapping convoluted metal strips comprising:
   (a) an elongated body;
   (b) a cylindrical portion extending axially from one end of said body having an outer diameter substantially equal to the inner diameter of the flexible conduit and threads formed in the outer surface of said cylindrical portion, which threads are formed to fit within and threadedly engage the convoluted metal strips of the flexible conduit;
   (c) a portion integrally attached to said body adjacent the other end thereof having an opening therethrough located generally on the longitudinal axis of said body for connecting an elongated, flexible pulling member thereto and providing axial pull thereon; and
   (d) shroud means including a generally conically shaped portion having the connecting portion attached at the smaller end thereof and the cylindrical portion extending axially from the larger end thereof with the larger end having a diameter larger than the greater outer diameter of the flexible conduit for protecting the one end of the flexible cable and for guiding the movements of said pulling means during a conduit pulling operation.
2. Flexible conduit pulling means as set forth in claim 1 wherein the body, the threaded portion, the connecting means and the shroud means are all formed in an integral unit.

References Cited

UNITED STATES PATENTS 2,750,152   6/1956   Schinske _____ 254—134.3(FT)

FOREIGN PATENTS 1,157,175   11/1963   Germany _____ 294—86

EVON C. BLUNK, Primary Examiner

D. D. WATTS, Assistant Examiner

U.S. Cl. X.R.

254—134.3